United States Patent
Yamamoto et al.

(10) Patent No.: US 8,206,875 B2
(45) Date of Patent: Jun. 26, 2012

(54) FUEL CELL AND SEPARATOR FOR THE SAME

(75) Inventors: Yoshinori Yamamoto, Toyota (JP); Yuichi Yagami, Susono (JP); Jiro Aizaki, Toyota (JP); Junichi Shirahama, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 630 days.

(21) Appl. No.: 12/296,217

(22) PCT Filed: Apr. 20, 2007

(86) PCT No.: PCT/JP2007/059127
§ 371 (c)(1), (2), (4) Date: Oct. 6, 2008

(87) PCT Pub. No.: WO2007/126032
PCT Pub. Date: Nov. 8, 2007

(65) Prior Publication Data
US 2009/0286136 A1    Nov. 19, 2009

(30) Foreign Application Priority Data
Apr. 25, 2006   (JP) ................. 2006-121190

(51) Int. Cl.
*H01M 8/02* (2006.01)
*H01M 2/08* (2006.01)
(52) U.S. Cl. ......... 429/508; 429/460; 429/463; 429/514
(58) Field of Classification Search ................... None
See application file for complete search history.

(56) References Cited

U.S. PATENT DOCUMENTS 5,424,144 A * 6/1995 Woods, Jr. ............... 429/460

FOREIGN PATENT DOCUMENTS

| JP | 61-216252 A | 9/1986 |
|---|---|---|
| JP | 2001-283893 A | 10/2001 |
| JP | 2002-270202 A | 9/2002 |
| JP | 2002-305006 A | 10/2002 |
| JP | 2003-077499 A | 3/2003 |
| JP | 2003-178776 A | 6/2003 |
| JP | 2004-047270 A | 2/2004 |
| JP | 2004-165125 A | 6/2004 |
| JP | 2005-56861 A | 3/2005 |
| JP | 2005-116404 A | 4/2005 |
| JP | 2005-267912 A | 9/2005 |
| JP | 2005-317311 A | 11/2005 |

OTHER PUBLICATIONS

Machine translation of JP 2004-47270, Feb. 2004.*

* cited by examiner

*Primary Examiner* — Jonathan Crepeau
(74) *Attorney, Agent, or Firm* — Kenyon & Kenyon LLP

(57) ABSTRACT

The contraction and deformation of a seal member are inhibited. To realize this, in a separator in which the shapes of projections and recesses forming at least fluid passages are inverted from each other on the front surface and the back surface of the separator and which is provided with a manifold for supplying and discharging a fluid, the separator, when a seal member for sealing the fluid is provided along the edge side of the separator forming the contour of the manifold, a projecting section capable of functioning as a spacer between the separator and another member adjacent to the separator is provided between the seal member and the edge side.

6 Claims, 4 Drawing Sheets

FUEL CELL AND SEPARATOR FOR THE SAME

This is a 371 national phase application of PCT/JP2007/059127 filed 20 Apr. 2007, which claims priority to Japanese Patent Application No. 2006-121190 filed 25 Apr. 2006, the contents of which are incorporated herein by reference.

BACKGROUND OF THE INVENTION

1. Field of the Invention

The present invention relates to a fuel cell and a separator for the same. More particularly, it relates to the improvement of the structure of a separator in which the shapes of projections and recesses constituting fluid passages are formed.

2. Description of Related Art

In general, a fuel cell (e.g., a polymer electrolyte fuel cell) is constituted by laminating a plurality of cells each including a separator held between electrolytes. Moreover, the separator is provided with a manifold for supplying to or discharging from the cells a reactant gas (a fuel gas, an oxidizing gas) or a coolant.

Heretofore, with regard to the manifold provided so as to supply and discharge fluids in this manner, it has been disclosed that ribs (also referred to as predetermined dimensional portions in the present description) are formed as spacers between adjacent separators outside (on the outer peripheral side of) a seal member (a gasket, an adhesive or the like) around each manifold (e.g., see Patent Document 1).

[Patent Document 1] Japanese Patent Application Laid-Open No. 2003-77499

SUMMARY OF THE INVENTION

However, a separator having the above conventional structure is not sufficient in that a seal member sometimes contracts and is deformed.

Therefore, an object of the present invention is to provide a fuel cell capable of inhibiting the contraction and deformation of the seal member, and a separator for the fuel cell.

To solve such a problem, the present inventor has performed various types of investigation. In the separator, especially an edge side portion forming the manifold and the vicinity of the portion are largely influenced by the pressure fluctuation of the fluid (a reactant gas or a coolant). That is, the pressure fluctuation of the fluid circulated through the manifold easily directly acts on the seal member provided around the edge side, and eventually the seal member contracts and is deformed as described above. The original function of the seal member is sometimes impaired. Concerning this respect, the present inventor has noticed the characteristics of the conventional structure of the separator, especially a relation between the structure and the fluid passing through the manifold, and has found a technology capable of solving the above problem.

The present invention is based on such a finding, and there is provided a separator in which the shapes of projections and recesses forming at least fluid passages are inverted from each other on the front surface and the back surface of the separator and which is provided with a manifold to supply and discharge the fluid, the separator comprising: a seal member which is provided along the edge side of the separator forming the contour of the manifold and which seals the fluid; and a projecting section provided between the seal member and the edge side and having a function of a spacer between the separator and another member adjacent to the separator.

The separator is provided with the manifold which supplies to or discharges from each fuel cell a fluid such as a fuel gas, an oxidizing gas or a coolant. Moreover, the seal member is provided around this manifold of the separator, and each fluid does not leak from a predetermined passage. In the separator according to the present invention, the projecting section is provided between such a seal member and the edge side of the separator forming the manifold. When the separators and the like are laminated, these projecting sections may directly (or indirectly) abut on each other to function as the spacer. In this case, these projecting sections and another projecting section constituted of, for example, a rib (a predetermined dimensional portion) outside (on the outer peripheral side of) the seal member form a space having a predetermined width.

Moreover, it is preferable that the projecting sections of the separators described above are preferably formed on the separators laminated so that at least a part of the separator comes in contact with at least a part of the other separator and that these projecting sections come in contact with one another in a case where the separators are laminated. When the separators are laminated in this manner, the projecting sections formed on the separators come in contact with each other to form a space.

Furthermore, the projecting section may be formed on at least a portion other a portion which supplies to or discharges from the manifold the fluid in the planar direction of the separator. In this case, the space having the predetermined width can be secured to inhibit the deformation (contraction) of the seal member without influencing the flow of each fluid in the planar direction of the separator (in other words, a direction vertical to a laminating direction).

Additionally, in such a separator, it is preferable that a portion of the contour of the manifold which does not supply or discharge the fluid in the planar direction of the separator is provided with a series of projecting sections and that a portion which supplies or discharges the fluid is provided with discontinuous projecting sections. The discontinuously formed projecting sections can form such a space as to avoid the deformation (contraction) of the seal member while allowing each fluid to flow among the projecting sections.

Moreover, in the above separator, it is preferable that the projecting section is also formed outside the seal member. In this case, the projecting section formed outside the seal member and the projecting section formed in the seal member (i.e., the projecting section formed along the contour of the manifold) can form a space where the deformation of the seal member can be inhibited.

Furthermore, according to the present invention, there is provided a fuel cell provided with the separator according to any one of the first to fifth aspects of the invention, wherein a member of the separator provided on the back surface side of the projecting section is provided with another projecting section which supports the projecting section from the back surface side.

The projecting section formed on a part of the separator functions as a spacer so that the projecting sections abut on one another in a case where the separators are laminated, and forms a space in which the deformation of the seal member is inhibited. Moreover, another projecting section provided on a member positioned on the back surface side of the projecting section supports, so-called backs up the above projecting section from the back surface side to inhibit the deformation of the projecting section.

In such a fuel cell, the other projecting section is formed of a plurality of discontinuously formed projections, and fluid passages are preferably formed among these projections. In this case, the projecting section formed on the separator can be backed up and inhibited from being deformed while securing the passages for supplying and discharging the fluids.

Furthermore, in such a fuel cell, the member provided on the back surface side of the projecting section can be a resin frame.

DETAILED DESCRIPTION OF PREFERRED EMBODIMENT

A preferable embodiment of the present invention will hereinafter be described with reference to the drawings.

Figure 1:
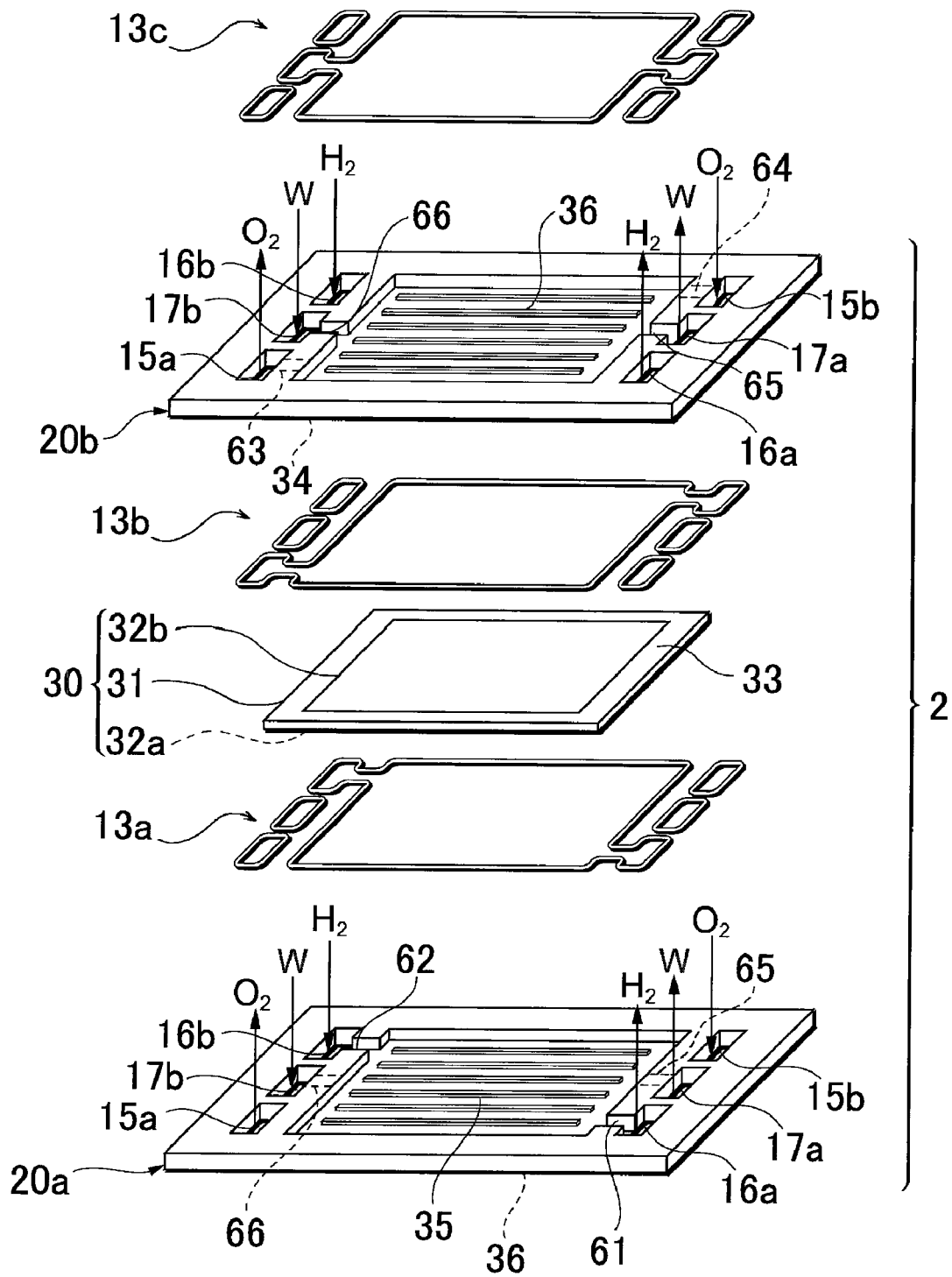
FIG. 1 is an exploded perspective view showing one embodiment of the present invention and showing cells of a separator of a fuel cell of the present embodiment in an exploded manner.

FIGS. 1 to 5 show embodiments of a fuel cell and a separator for the fuel cell according to the present invention. In the present embodiment, a separator 20 (FIG. 1 shows two separators denoted with symbols 20a, 20b) includes manifolds 15, 16 and 17 (FIG. 1 shows manifolds denoted with symbols 15a, 15b, 16a, 16b, 17a and 17b) for supplying to or discharging from each cell 2 a reactant gas (e.g., a fuel gas, an oxidizing gas) or a coolant (e.g., cooling water), and the separators are laminated together with a membrane-electrode assembly 30 to constitute the cell 2 (see FIG. 1 and the like). Moreover, in this separator 20, the shapes of projections and recesses forming at least fluid passages are inverted from each other on the front surface and the back surface of the separator.

Here, in the present embodiment, seal members 13 (denoted with symbols 13a, 13b and 13c in FIG. 1) for sealing a fluid are provided along edge sides 20e of the separator 20 which form the contours of the manifolds 15 to 17. Furthermore, a projecting section 21 capable of functioning as a spacer between the separator 20 and another member adjacent to the separator can be provided between the seal member 13 and the edge side 20e (see FIG. 3, etc.). This projecting section 21 can inhibit the seal member 13 from easily contracting, and hence the deformation of the seal member due to the contraction can be inhibited.

In the embodiment described hereinafter, first the schematic constitution of a fuel cell 1 and the schematic constitution of a cell 2 constituting the fuel cell 1 will be described. Afterward, the constitution of the above separator 20 will be described.

Figure 5:
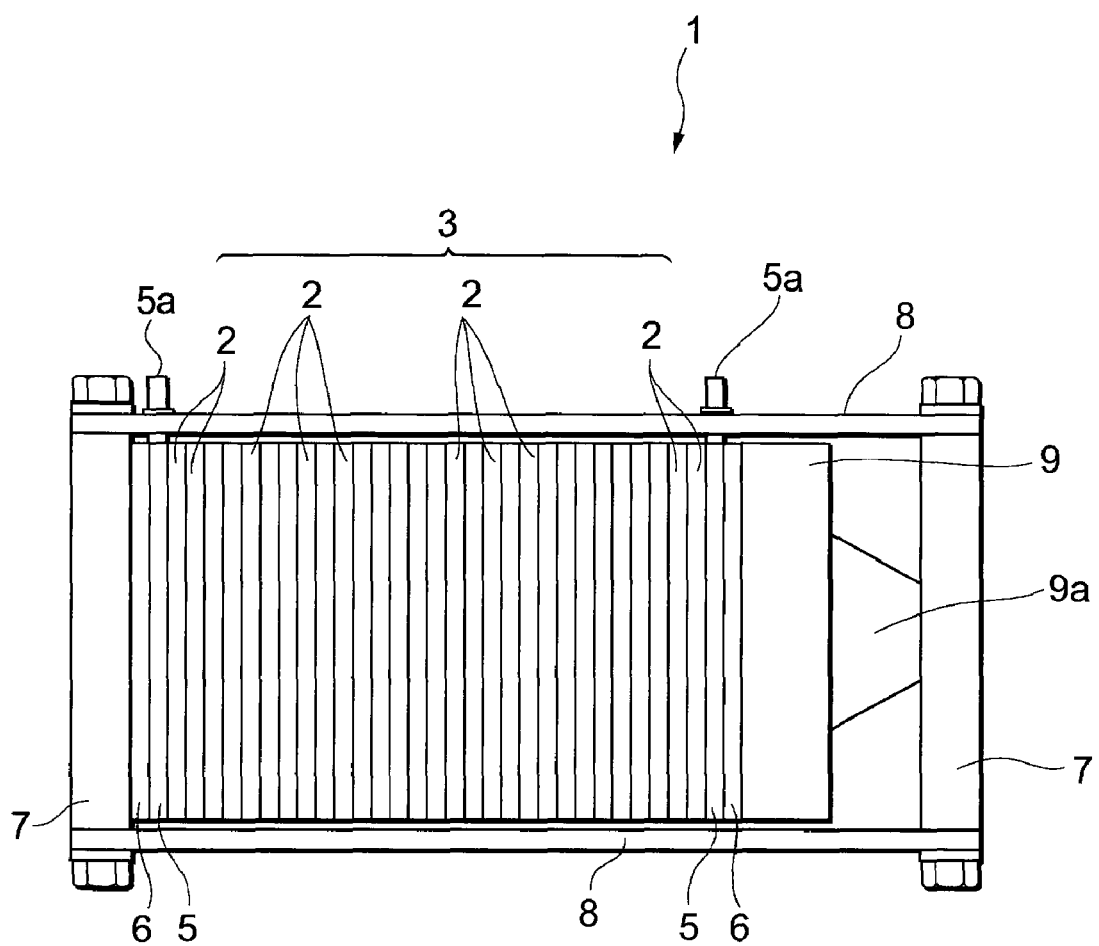
FIG. 5 is a side view showing one example of the structure of the fuel cell.

The fuel cell 1 includes a cell laminate 3 in which a plurality of cells 2 are laminated, and terminal plates 5 provided with output terminals 5a, insulators (insulating plates) 6 and end plates 7 are further disposed externally from the laminating direction of the end cells 2 positioned at both ends of the cell laminate 3 (see FIG. 5). A predetermined compressive force is added to the cell laminate 3 in the laminating direction by tension plates 8 extended so as to connect the end plates 7 to each other. Furthermore, a pressure plate 9 and a spring mechanism 9a are provided between the end plate 7 and the insulator 6 on one end side of the cell laminate 3, so that the fluctuations of loads exerted on the cells 2 are absorbed.

The terminal plate 5 is a member which functions as a collector plate. For example, a meal such as iron, stainless steel, copper or aluminum is formed into a plate-like shape. The surface of the terminal plate 5 on the side of the end cell 2 is subjected to a surface treatment such as a plating treatment, and such a surface treatment secures a contact resistance with the end cell 2. Examples of plating include gold, silver, aluminum, nickel, zinc and tin. In the present embodiment, the surface of the terminal plate is subjected to, for example, a tin plating treatment in consideration of conductivity, workability and inexpensiveness.

The insulator 6 is a member which performs a function of electrically insulating the terminal plate 5 and the end plate 7. To perform such a function, this insulator 6 is formed of a resin material such as polycarbonate into a plate-like shape. Moreover, when engineering plastic having a superior heat resistance is employed as the material of the insulator 6, the insulator advantageously becomes robust, and the fuel cell 1 can preferably be lightened.

The end plate 7 is formed of any type of metal (iron, stainless steel, copper, aluminum or the like) into a plate-like shape in the same manner as in the terminal plate 5. In the present embodiment, this end plate 7 is formed using, for example, copper, but this is merely one example, and the end plate may be formed of another metal.

It is to be noted that this fuel cell 1 can be used as, for example, a car mounted power generation system of a fuel cell hybrid vehicle (FCHV), but this is not restrictive, and the fuel cell may be used as a power generation system to be mounted on any type of mobile body (e.g., a ship, an airplane or the like) or a self-propelled body such as a robot, or as a stationary fuel cell.

Next, FIG. 1 shows the schematic constitution of the cell 2 of the fuel cell 1 in the present embodiment.

The cell 2 is constituted of a membrane-electrode assembly (hereinafter referred to as the MEA) 30 as a specific example of an electrolyte, and a pair of separators 20 (denoted with symbols 20a, 20b in FIG. 1) between which the MEA 30 is held (see FIG. 1). The MEA 30 and the respective separators 20a, 20b are formed into an approximately rectangular plate-like shape. Furthermore, the MEA 30 is formed so that its outer shape is smaller than that of the respective separators 20a, 20b. In addition, the vicinities of peripheral edges between the MEA 30 and the separators 20a, 20b are molded together with a first seal member 13a and a second seal member 13b.

The MEA 30 is constituted of a polymeric electrolyte membrane (hereinafter referred to also simply as the electrolyte membrane) 31 constituted of an ion exchange membrane of a polymeric material, and a pair of electrodes (an anode and a cathode) 32a, 32b which sandwich the electrolyte membrane 31 from both the surfaces thereof. The electrolyte membrane 31 of them is formed so as to be slightly larger than the respective electrodes 32a, 32b. To the electrolyte membrane 31, the respective electrodes 32a, 32b are joined by, for example, hot pressing, a peripheral portion 33 of the electrolyte membrane being left.

The electrodes 32a, 32b which constitute the MEA 30 are made of, for example, a porous carbon material (a diffusion layer) on which a catalyst such as fine platinum particles is carried. To the one electrode (anode) 32a, a hydrogen gas as a fuel gas (a reactant gas) is fed, and to the other electrode (cathode) 32b, an oxidizing gas (a reactant gas) such as air or an oxidizing agent is fed. These two kinds of reactant gases electrochemically react in the MEA 30 to obtain the electromotive force of the cell 2.

The separators 20a, 20b are made of a gas-impermeable conductive material. Examples of the conductive material include carbon, conductive hard resins, and metals such as aluminum and stainless steel. In the present embodiment, the separators 20a, 20b are made of a base material of a plate-like metal (metal separators), and on the surfaces of the electrodes 32a, 32b of this base material, membranes having excellent corrosion resistance (e.g., membranes made by gold plating) are formed.

Moreover, on both the surfaces of the separators 20a, 20b, passages of grooves which are a plurality of recesses are formed. In a case where the separators 20a, 20b in the present embodiment are made of a base material of, for example, the plate-like metal, these passages can be formed by press molding. The thus formed groove-like passages constitute gas passages 34 of the oxidizing gas, gas passages 35 of a hydrogen gas, or cooling water passages 36. More specifically, on the inner surface of the separator 20a on the side of the electrode 32a, the plurality of hydrogen gas passages 35 are formed, and on the back surface (the outer surface) of the separator, the plurality of cooling water passages 36 are formed (see FIG. 1). Similarly, on the inner surface of the separator 20b on the side of the electrode 32b, the plurality of oxidizing gas passages 34 are formed, and on the back surface (the outer surface) of the separator, the plurality of cooling water passages 36 are formed (see FIG. 1). For example, in the case of the present embodiment, the gas passages 34 and the gas passages 35 in the cell 2 are formed so that they are parallel with each other. Furthermore, in the present embodiment, the cooling water passages 36 of both the separators in the two adjacent cells 2, 2 are integrally configured to form passages having a section such as a rectangular shape when the outer surface of the separator 20a of the one cell 2 is joined to the outer surface of the separator 20b of the adjacent other cell 2 (see FIG. 1). The vicinity of the peripheral edge between the separators 20a and 20b of the adjacent cells 2, 2 is molded together with the seal member 13.

Furthermore, as described above, in the respective separators 20a, 20b, the shapes of projections and recesses constituting at least fluid passages are inverted from each other on the front surface and the back surface of each separator. More specifically, in the separator 20a, the back surfaces of projection shapes (projection ribs) forming the gas passages 35 of the hydrogen gas have recessed shapes (recessed grooves) forming the cooling water passages 36, and the back surfaces of the recessed shapes (the recessed grooves) forming the gas passages 35 have projection shapes (projection ribs) forming the cooling water passages 36. Furthermore, in the separator 20b, the back surfaces of projection shapes (projection ribs) forming the gas passages 34 of the oxidizing gas have recessed shapes (recessed grooves) forming the cooling water passages 36, and the back surfaces of the recessed shapes (the recessed grooves) forming the gas passages 34 have projection shapes (projection ribs) forming the cooling water passages 36.

Moreover, around the ends of the separators 20a, 20b in a longitudinal direction (in the vicinity of one end shown on the left side as one faces FIG. 1 according to the present embodiment), there are formed manifolds 15a on the inlet side of the oxidizing gas, manifolds 16b on the outlet side of the hydrogen gas and manifolds 17b on the outlet side of the cooling water. For example, in the present embodiment, these manifolds 15a, 16b and 17b are formed of substantially rectangular or trapezoidal through holes provided in the respective separators 20a, 20b (see FIGS. 1, 2). Furthermore, the opposite ends of the separators 20a, 20b are provided with manifolds 15b on the outlet side of the oxidizing gas, manifolds 16a on the inlet side of the hydrogen gas and manifolds 17a on the inlet side of the cooling water. In the present embodiment, these manifolds 15b, 16a and 17a are also formed of substantially rectangular or trapezoidal through holes (see FIGS. 1, 2). It is to be noted that in FIG. 1, the cooling water is denoted with symbol W.

Among the above manifolds, the inlet-side manifold 16a and the outlet-side manifold 16b for the hydrogen gas in the separator 20a communicate with the gas passages 35 of the hydrogen gas via an inlet-side communication passage 61 and an outlet-side communication passage 62 as grooves formed in the separator 20a. Similarly, the inlet-side manifold 15a and the outlet-side manifold 15b for the oxidizing gas in the separator 20b communicate with the gas passages 34 of the oxidizing gas via an inlet-side communication passage 63 and an outlet-side communication passage 64 as grooves formed in the separator 20b (see FIG. 1). Furthermore, the inlet-side manifolds 17a and the outlet-side manifolds 17b for the cooling water in the respective separators 20a, 20b communicate with the cooling water passages 36 via inlet-side communication passages 65 and outlet-side communication passages 66 as grooves formed in the respective separators 20a, 20b. According to the above-mentioned constitution of the respective separators 20a, 20b, the oxidizing gas, the hydrogen gas and the cooling water are fed to the cell 2. Here, as a typical example, for example, the hydrogen gas passes through the communication passage 61 from the inlet-side manifold 16a of the separator 20a to flow into the gas passages 35, and is used for the power generation of the MEA 30. Afterward, the gas passes through the communication passage 62, and is discharged to the outlet-side manifold 16b.

Both the first seal member 13a and the second seal member 13b are formed of a plurality of members (e.g., four small rectangular frame members and a large frame member for forming fluid passages) (see FIG. 1). The first seal member 13a of them is provided between the MEA 30 and the separator 20a. More specifically, the first seal member is provided so that a part of the member is interposed between the peripheral portion 33 of the electrolyte membrane 31 and a portion of the separator 20a around the gas passages 35. Moreover, the second seal member 13b is provided between the MEA 30 and the separator 20b. More specifically, the second seal member is provided so that a part of the member is interposed between the peripheral portion 33 of the electrolyte membrane 31 and a portion of the separator 20b around the gas passages 34.

Furthermore, a third seal member 13c formed of a plurality of members (e.g., four small rectangular frame members and a large frame member for forming a fluid passage) is provided between the separator 20b and the separator 20a of the adjacent cells 2, 2 (see FIG. 1). This third seal member 13c is a member interposed between a portion of the separator 20b around the cooling water passages 36 and a portion of the separator 20a around the cooling water passages 36 to seal between these portions.

Next, the constitution of the separator 20 will be described (see FIGS. 1 to 4). It is to be noted that in FIG. 2, the drawing of the fine constitutions of the fluid passages (e.g., the cooling water passages 36) is omitted.

Figure 2:
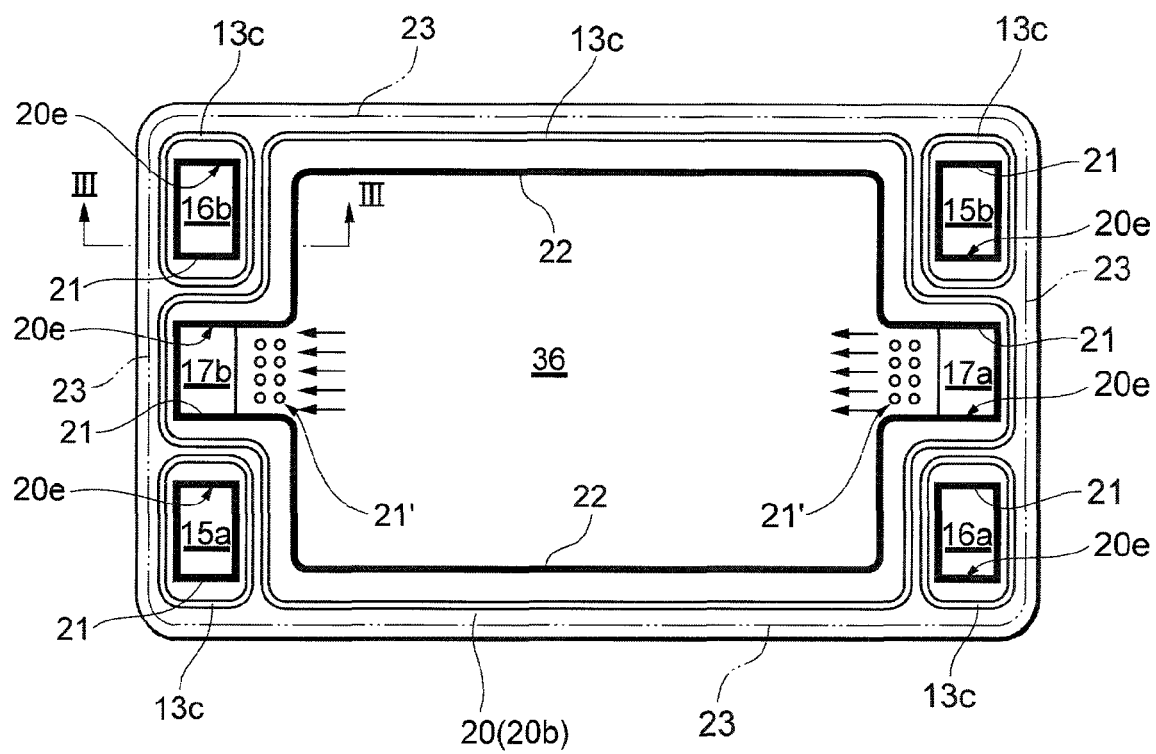
FIG. 2 is a plan view of the separator according to the embodiment of the present invention.

As described above, the separator 20 is provided with the manifolds 15a, 15b, 16a, 16b, 17a and 17b for supplying to or discharging from each cell 2 fluids such as the fuel gas, the oxidizing gas and coolant (see FIG. 2, etc.). Moreover, the seal members 13 are provided around these manifolds 15a, 15b, 16a, 16b, 17a and 17b of the separator 20, so that the fluids do not leak from predetermined passages.

Figure 3:
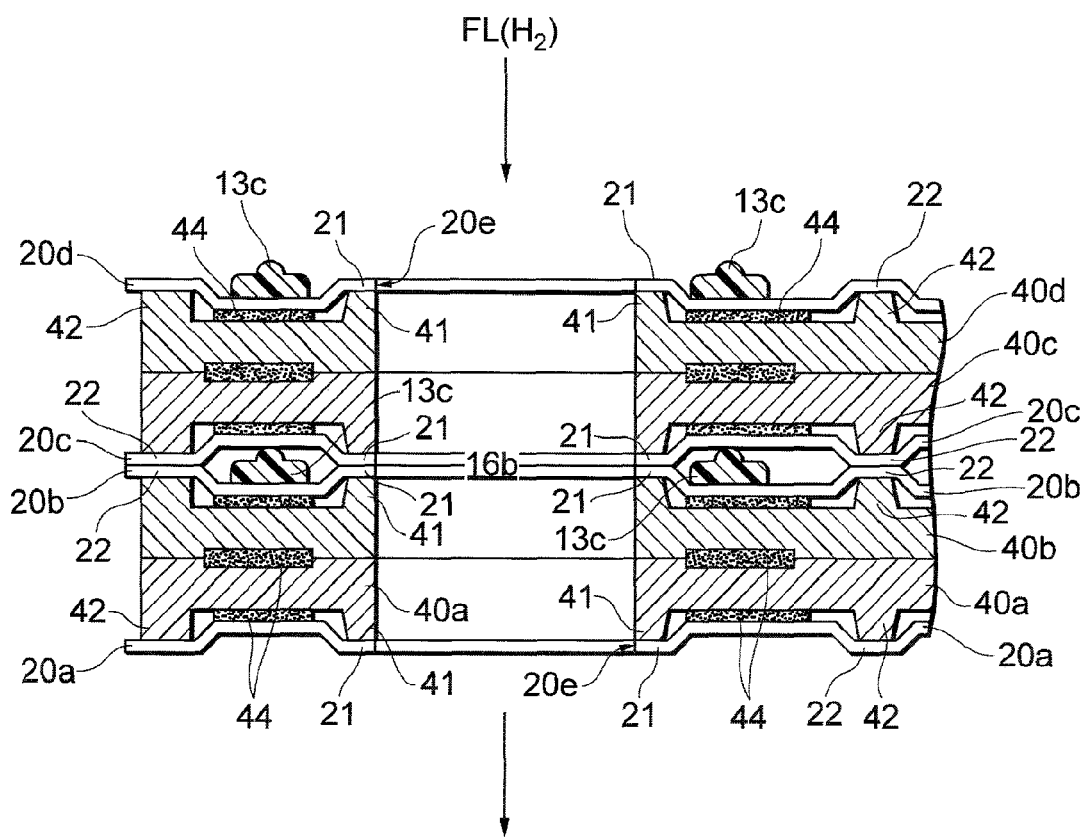
FIG. 3 is a diagram showing a structural example of laminated cells in a section cut along the III-III line of FIG. 2.
Figure 4:
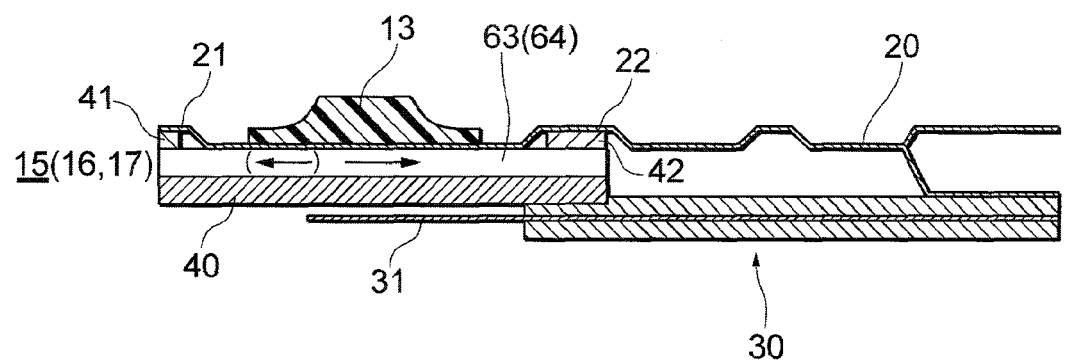
FIG. 4 is an enlarged sectional view showing a structural example of a constitution in which when a resin frame is provided with another projecting section, the other projecting section is constituted of a plurality of discontinuously formed projections.

Here, the projecting section 21 having such a shape as to project in a cell laminating direction is provided between the seal member 13 and the edge side 20e of the hole provided in the separator 20 so as to form the manifolds 15a, 15b, 16a, 16b, 17a and 17b (see FIG. 3, etc.). Moreover, outside (the outside mentioned herein is the outer peripheral side, and is more specifically the side opposite to the manifolds 15a, 15b, 16a, 16b, 17a and 17b), another projecting section 22 constituted of a projection rib (also referred to as a predetermined dimensional portion in the present description) is formed (see FIGS. 3, 4). It is to be noted that in FIG. 2 showing the planar structure of the separator 20 (20b), to clarify a difference from the seal member 13 (13c), the projecting sections 21 and a portion provided with the projecting section 22 are shown by bold lines (see FIG. 2).

When the separators 20 having the above constitution are laminated, as shown in FIG. 3, the projecting section 21 of the separator (e.g., 20b) on the inner peripheral side is allowed to directly abut on the projecting section 21 of the other separator (e.g., the separator 20c) on the inner peripheral side. Furthermore, the projecting section 22 of the separator 20b on the outer peripheral side can be allowed to directly abut on the projecting section 22 of the other separator 20c on the outer peripheral side. In this case, the projecting section 21 and the projecting section 22 can function as a spacer which forms a predetermined space between the sections (see FIG. 3).

In the present embodiment, the above seal member 13 (13c) is received in the space (a space substantially having a honeycomb-like section as one example) formed by the projecting section 21 and the projecting section 22. In the fuel cell 1 of the present embodiment in which the projecting section 21 and the projecting section 22 function as the spacers, the predetermined width (predetermined height) of the space for receiving the seal member 13 can easily be held. Therefore, it can be prevented that the seal member 13 is oppressed and contracts, and a structure in which the seal member 13 (13c) does not easily contract and is not easily deformed can be obtained.

In addition, the projecting section 21 of the separator 20 (20b) comes in contact with the projecting section 21 of the adjacent separator 20 (20c) in the edge side 20e where the manifolds 15 to 17 (e.g., the manifold 16b) through which a hydrogen gas $H_2$ flows as a fluid FL) are formed, so that these fluids are easily inhibited from leaking from the manifolds 15 to 17. In consequence, fluid sealing performances can advantageously further be improved.

Moreover, the projecting section 21 may be formed around the manifolds 15 to 17 (e.g., 16b), but if necessary, the projecting section may be formed in portions other than portions which supply to and discharge from the manifolds 15 to 17 the fluids in the planar direction of the separator 20. For example, in the present embodiment, as to the manifolds 17a, 17b for the cooling water, the projecting section 21 is not provided in a passage connecting the manifold 17a to the cooling water passage 36 and a passage connecting the cooling water passage 36 to the manifold 17b (see FIG. 2). In consequence, the projecting section 21 functions as the spacer in the other portion without influencing the flow of each fluid in the planar direction of the separator 20 (20b), and the space having a predetermined width can be secured to inhibit the deformation of the seal member 13.

Furthermore, in the contours of the manifolds 17a, 17b and the like, the portions which do not supply or discharge the fluid in the planar direction of the separator 20 (20b) may be formed of a series of projecting sections 21, and the portions which supply or discharge the fluid (e.g., the cooling water) may be provided with discontinuous projecting sections 21'. The discontinuous projecting sections 21' may be constituted of, for example, a plurality of circular projections and the like arranged at equal intervals (see FIG. 2). The thus discontinuously formed projecting sections 21' can preferably secure a space for avoiding the deformation (contraction) of the seal member 13 (13c) while allowing the fluids (e.g., the cooling water) to flow between the projecting sections 21'.

Moreover, in the above separator 20 (20b), it is preferable that another projecting section is also formed outside the seal member 13 (13c). One example will be described. As shown in, for example, FIG. 2, a projecting section 23 having such a shape as to extend along the outer peripheral edge of the separator 20b may be formed (see FIG. 2). In this case, the projecting section 23 formed outside the seal member 13 (13c) and the projecting section 21 formed on the inner side of the seal member 13 (13c) (i.e., the projecting section 21 formed along the contour of the manifold 17 or the like) can form a space capable of inhibiting the deformation of the seal member 13 (13c).

Furthermore, when a member other than the separator 20 is provided on the back surface side of the projecting section 21 of the separator 20, another projecting section for supporting the projecting section 21 from the back surface side is preferably formed. For example, in the present embodiment, a frame made of, for example, a resin (hereinafter referred to as the resin frame) 40 is interposed between the separator 20 and the adjacent separator 20, and the resin frame 40 is further provided with another projecting section 41. This will more specifically be described. Resin frames 40a, 40b interposed between the separators 20a and 20b and resin frames 40c, 40d interposed between the separators 20c and 20d are provided with the projecting sections 41 for supporting the projecting sections 21 of the separators 20a to 20d from the back surface side (see FIG. 3). For example, in the case of the present embodiment, these projecting sections 41 have such a shape to enter dimples or depressions formed on the back surface side of the projecting sections 21, and the projecting sections can function as backup members so that these projecting sections 21 are not easily deformed even when oppressed.

It is to be noted that here the other projecting sections 41 for backing up the projecting sections 21 have been illustrated. However, similarly, another projecting section 42 which backs up the projecting section 22 of the separator 20 from the back surface side may be provided on the resin frame 40 (see FIG. 3). The other projecting section 42 can also back up the projecting section 22 formed on the separator 20 from the back surface side to inhibit the deformation of the projecting section in the same manner as in the above projecting section 41.

Moreover, when the resin frames 40 are provided with the other projecting sections 41 having a backup function, these other projecting sections 41 are preferably constituted of a plurality of discontinuously formed projections. As shown in, for example, FIG. 4, a passage (the inlet-side communication passage 63 or the outlet-side communication passage 64) for circulating the oxidizing gas between the manifold 15 for the oxidizing gas and the MEA 30 may be formed in the resin frame 40. In this case, while discontinuously formed projections, grooves or the like secure the fluid passages, projecting portions may constitute the separate projecting sections 41, 42 (see FIG. 4). In this case, while forming the fluid passage, even the backup function can be realized.

It is to be noted that a portion present between the resin frame 40 and the resin frame 40 and denoted with reference numeral 44 is an adhesive or an adhesive layer formed of this adhesive (see FIG. 3). As one example of the adhesive in this case, in addition to an epoxy-based adhesive, a silicone-base adhesive or the like may be used. Even a silicone RTV rubber, an urethane RTV rubber or the like as an elastic adhesive may be used.

As described above, according to the separator 20 of the fuel cell 1 of the present embodiment, the projecting sections 21 are formed even around the manifolds 15 to 17. When the separators 20 are laminated, the projecting sections 21 of the separators are allowed to abut on each other, or the projecting section is allowed to abut on the separate projecting section 22, thereby functioning as the spacer. Therefore, there is an advantage that the space is easily secured between the sections. Therefore, even when, for example, the seal member 13 received in this space is oppressed to exert the compressive force, the deformation of the seal member can be inhibited.

Additionally, in the present embodiment, as the members (the resin frame 40 as one example) provided on the back surface side of the separator 20, the other projecting sections 41, 42 capable of backing up the projecting sections 21, 22 from the back surface side as described above are separately provided, and hence there is a further advantage that the deformations of these projecting sections 21, 22 can be inhibited (see FIG. 3, etc.).

It is to be noted that the above embodiment is one example of the preferable embodiment according to the present invention, but this is not restrictive, and the present invention can variously be modified and implemented without departing from the scope of the present invention. For example, in the above embodiment, the case of the adjacent separators 20b, 20c has mainly been illustrated, but this is not restrictive, and needless to say, the separators to be laminated (e.g., 20a, 20d in FIG. 3) may have a similar structure.

Moreover, in the present embodiment, a case where the projecting sections 21 are provided between the edge sides 20e of the separators 20 forming the contours of the manifolds 15 to 17 and the seal members 13 has been described, but the projecting section mentioned herein is sufficient when viewed from one surface. That is, in the case of, for example, press forming, when one surface is provided with a recessed section (e.g., a dimple), the back surface is provided with a projection having an inverted shape. Therefore, this projection can function as the projecting section 21 mentioned in the present description. In short, there is not any special restriction on the projecting section 21 (further the projecting section 22) mentioned in the present description as long as the projecting section is formed on one of the surfaces and can function as the spacer at a time when the cells are laminated. It just does not matter if a recessed section is formed on the back surface side.

Furthermore, in the present embodiment, as one example of another member adjacent to the separator 20, another separator 20 has been illustrated, but another member (e.g., a membrane-like member or the like) is sometimes interposed. Even in this case, the present invention can be applied.

Additionally, it has been described in the present embodiment that the projecting section 21 is allowed to directly abut on the projecting section 21, but the projecting section may indirectly abut. For example, when the other member is interposed between the separators 20 as described above, needless to say, the projecting sections 21 (further the projecting sections 22) may indirectly abut on each other via the other member.

INDUSTRIAL APPLICABILITY

According to the present invention, in a constitution in which a seal member does not easily contract, the contraction and deformation of the seal member can be inhibited.

Therefore, the present invention can broadly be used in a fuel cell and a separator for the fuel cell having such requirements.

The invention claimed is:

1. A separator in which the shapes of projections and recesses forming at least fluid passages are inverted from each other on the front surface and the back surface of the separator and which is provided with a manifold to supply and discharge the fluid, an edge side of the separator forming the contour of said manifold, the separator comprising:
   a seal member which is provided along the edge side of the separator forming the contour of the manifold and which seals the fluid; and
   a projecting section provided between the seal member and the edge side and having a function of a spacer between the separator and another member adjacent to the separator,
   wherein a member provided on the back surface side of the projecting section of the separator is provided with another supporting projecting section which enters a recessed section formed on the back surface side of the projecting section, and the projecting section of the separator is backed up by the other supporting projecting section so that the projecting section is not easily deformed even when oppressed, and
   wherein the projecting section is provided on each of the separators laminated so that at least a part of the separator comes in contact with at least a part of the other separator, and these projecting sections come in contact with each other in a case where the separators are laminated.

2. A fuel cell which comprises the separator according to claim 1, wherein the member to be provided on the back surface side of the projecting section is a resin frame.

3. A separator in which the shapes of projections and recesses forming at least fluid passages are inverted from each other on the front surface and the back surface of the separator and which is provided with a manifold to supply and discharge the fluid, an edge side of the separator forming the contour of said manifold, the separator comprising:
   a seal member which is provided along the edge side of the separator forming the contour of the manifold and which seals the fluid; and
   a projecting section provided between the seal member and the edge side and having a function of a spacer between the separator and another member adjacent to the separator,
   wherein a member provided on the back surface side of the projecting section of the separator is provided with another supporting projecting section which enters a recessed section formed on the back surface side of the projecting section, and the projecting section of the separator is backed up by the other supporting projecting section so that the projecting section is not easily deformed even when oppressed,
   wherein the projecting section is formed on at least a portion other than a portion which supplies to or discharges from the manifold the fluid in the planar direction of the separator, and
   wherein a portion of the contour of the manifold which does not supply or discharge the fluid in the planar direction of the separator is provided with a series of projecting sections, and a portion which supplies or discharges the fluid is provided with discontinuous projecting sections.

4. A fuel cell which comprises the separator according to claim 3, wherein the member to be provided on the back surface of the projecting section is a resin frame.

5. A separator in which the shapes of projections and recesses forming at least fluid passages are inverted from each other on the front surface and the back surface of the separator and which is provided with a manifold to supply and discharge the fluid, an edge side of the separator forming the contour of said manifold, the separator comprising:
- a seal member which is provided along the edge side of the separator forming the contour of the manifold and which seals the fluid; and
- a projecting section provided between the seal member and the edge side and having a function of a spacer between the separator and another member adjacent to the separator,
- wherein a member provided on the back surface side of the projecting section of the separator is provided with another supporting projecting section which enters a recessed section formed on the back surface side of the projecting section, and the projecting section of the separator is backed up by the other supporting projecting section so that the projecting section is not easily deformed even when oppressed, and
- wherein the projecting section configured to function as the separator between the separator and the other member adjacent to the separator is also formed outside the seal member.

6. A fuel cell which comprises the separator according to claim 5, wherein the member to be provided on the back surface of the projecting section is a resin frame.

* * * * *